(12) United States Patent  (10) Patent No.: US 8,682,064 B2
Yagyuu  (45) Date of Patent: Mar. 25, 2014

(54) BUILDING CHANGE DETECTION APPARATUS, BUILDING CHANGE DETECTION METHOD AND PROGRAM

(75) Inventor: Hiroyuki Yagyuu, Osaka (JP)

(73) Assignee: NEC System Technologies, Ltd., Osaka-shi, Osaka (JP)

( * ) Notice: Subject to any disclaimer, the term of this patent is extended or adjusted under 35 U.S.C. 154(b) by 965 days.

(21) Appl. No.: 12/292,763

(22) Filed: Nov. 25, 2008

(65) Prior Publication Data

US 2010/0128977 A1  May 27, 2010

(51) Int. Cl.
| G06K 9/00 | (2006.01) |
| G06K 9/52 | (2006.01) |
| G06K 9/68 | (2006.01) |
| G06K 9/62 | (2006.01) |
| G06K 9/32 | (2006.01) |
| G06K 9/46 | (2006.01) |

(52) U.S. Cl.
USPC ........... 382/165; 382/113; 382/154; 382/203; 382/206; 382/218; 382/224; 382/294

(58) Field of Classification Search
USPC ......... 382/109, 113, 154, 165, 203, 206, 218, 382/224, 294
See application file for complete search history.

(56) References Cited

U.S. PATENT DOCUMENTS

| 2002/0061132 A1* | 5/2002 | Furukawa | 382/154 |
| 2007/0025595 A1* | 2/2007 | Koizumi et al. | 382/103 |
| 2007/0226004 A1* | 9/2007 | Harrison | 705/1 |
| 2008/0063238 A1* | 3/2008 | Wiedemann et al. | 382/103 |
| 2010/0100835 A1* | 4/2010 | Klaric et al. | 715/765 |

FOREIGN PATENT DOCUMENTS

| JP | 3-167678 | 7/1991 |
| JP | 2002-63580 | 2/2002 |
| JP | 2004-117245 | 4/2004 |
| JP | 2004-198530 | 7/2004 |
| JP | 2005-234603 | 9/2005 |
| JP | 2007-3244 | 1/2007 |
| JP | 2007-34808 | 2/2007 |

* cited by examiner

*Primary Examiner* — Amir Alavi
*Assistant Examiner* — Kenny Cese
(74) *Attorney, Agent, or Firm* — McGinn Intellectual Property Law Group, PLLC

(57) ABSTRACT

A building change detection apparatus detects a change in a building in a predetermined area on a map between a first time point and a second time point later than the first time point. A first image data acquiring unit acquires first image data of the predetermined area photographed at the first time point. A second image data acquiring unit acquires second image data of the predetermined area photographed at the second time point. A feature change detecting unit compares the first image data with the second image data to detect changes in features including a building in the predetermined area. A building absent area specifying unit specifies a building absent area in the predetermined area where a building is not present. A building change detecting unit detects a change in a building in the predetermined area by setting a feature whose change is detected by the feature change detecting unit in the predetermined area from which the building absent area is excluded, as a changed building in the predetermined area.

12 Claims, 9 Drawing Sheets

BUILDING CHANGE DETECTION APPARATUS, BUILDING CHANGE DETECTION METHOD AND PROGRAM

BACKGROUND OF THE INVENTION

1. Field of the Invention

The present invention relates to a building change detection apparatus or the like that detects a change in a feature, particularly, a building, on a map.

2. Description of the Related Art

Methods of detecting a change in a building (structure) on a map include a method of detecting changes in buildings on a map by projecting the map on an aerial photograph and visually comparing the buildings on the map with buildings on the aerial photograph one by one. However, this scheme brings about problems of needing a lot of works and cost due to visual examination of all changes in buildings on a map, and causing manual-work originated mis-detection.

A change in a building on a map indicates a change originated from disappearance of a structure or new building of a structure. Disappearance of a structure means that a structure disappears to leave a vacant land. New building of a structure means that a new structure is added on a vacant land.

In view of such circumstances, there has been proposed a building change detection method using an aerial photograph, a satellite image or the like as described in Unexamined Japanese Patent Application KOKAI Publication No. 2002-63580. Unexamined Japanese Patent Application KOKAI Publication No. 2002-63580 describes an image matching method of automatically searching an image for a structure which matches with an indefinite-shaped window created from the shape of a house on a map using two or more kinds of images of the same area picked up by aerial photographing or satellite imaging, and notifying disappearance of a structure when there is no structure matching with the indefinite-shaped window.

Other techniques of determining a change in structure or the like from new and old image data or laser data are described in Unexamined Japanese Patent Application KOKAI Publication No. 2004-117245, Unexamined Japanese Patent Application KOKAI Publication No. 2007-3244 and Unexamined Japanese Patent Application KOKAI Publication No. 2007-34808. Further, Unexamined Japanese Patent Application KOKAI Publication No. 2004-198530 and Unexamined Japanese Patent Application KOKAI Publication No. 2005-234603 describe a technique of collating a map with image data to determine a change in a feature, such as new building of a structure, on the map.

Unexamined Japanese Patent Application KOKAI Publication No. H03-167678 describes a method of acquiring three-dimensional numerical data from a stereo image.

The specification of Japanese Patent Application No. 2007-145971 filed by the same applicant as the present invention describes the invention that extracts height data of a feature on the ground from a plurality of photographed images of the ground by stereo matching process to detect disappearance of a structure and new building thereof based on a change in height.

In detecting disappearance of a building and new building thereof based on a change in height of a feature acquired from image data simply by using the aforementioned related art, the following erroneous detection may occur due to the influences of a feature other than a building, such as a tree, road, river or lake.

For example, growing, pruning, cutting or the like of a tree changes the height thereof. Therefore, there is a possibility that the changed portion of the tree is erroneously detected as a changed portion of a building. When a tree at a predetermined location grows and gets taller, for example, such may be erroneously detected that a building has been newly built at the location. When a tree is cut to get shorter, such may be erroneously detected that a building has disappeared.

Vehicles run on a road, so that if an image is photographed while a large vehicle, for example, is running, it may be erroneously detected that a building has been newly built at the location. When a vehicle which has been present on a road before does not exist at the time of next shooting, on the other hand, it may be erroneously detected that a building has disappeared.

In addition, a river, lake or the like greatly changes its height from the ground due to a weather, tide or the like, which is a large factor in erroneous detection of a change in a building.

SUMMARY OF THE INVENTION

Accordingly, the present invention has been made in view of the foregoing situations, and it is an object of the present invention to provide a building change detection apparatus or the like capable of more accurately detecting a change in a building on a map.

To achieve the object, a building change detection apparatus according to a first aspect of the invention is a building change detection apparatus for detecting a change in a building in a predetermined area on a map between a first time point and a second time point later than the first time point, the apparatus comprising:

a first image data acquiring unit that acquires first image data of the predetermined area photographed at the first time point;

a second image data acquiring unit that acquires second image data of the predetermined area photographed at the second time point;

a feature change detecting unit that compares the first image data with the second image data to detect changes in features including a building in the predetermined area;

a building absent area specifying unit that specifies a building absent area in the predetermined area where a building is not present; and a building change detecting unit that detects a change in a building in the predetermined area by setting a feature whose change is detected by the feature change detecting unit in the predetermined area from which the building absent area is excluded, as a changed building in the predetermined area.

A building change detection method according to a second aspect of the invention is a building change detection method of detecting a change in a building in a predetermined area on a map between a first time point and a second time point later than the first time point, the method comprising:

a feature change detecting procedure of comparing first image data of the predetermined area photographed at the first time point with second image data of the predetermined area photographed at the second time point to detect changes in features including a building in the predetermined area;

a building absent area specifying procedure of specifying a building absent area in the predetermined area where a building is not present; and a building change detecting procedure of detecting a change in a building in the predetermined area by extracting a feature whose change is detected in the feature change detecting procedure in the predetermined area from which the building absent area is excluded, and setting the extracted feature as a changed building in the predetermined area.

A computer readable recording medium according to a third aspect of the invention is a computer readable recording medium recording a program for detecting a change in a building in a predetermined area on a map between a first time point and a second time point later than the first time point, the program allowing a computer to function as:

a first image data acquiring unit that acquires first image data of the predetermined area photographed at the first time point;

a second image data acquiring unit that acquires second image data of the predetermined area photographed at the second time point;

a feature change detecting unit that compares the first image data with the second image data to detect changes in features including a building in the predetermined area;

a building absent area specifying unit that specifies a building absent area in the predetermined area where a building is not present; and a building change detecting unit that detects a change in a building in the predetermined area by setting a feature whose change is detected by the feature change detecting unit in the predetermined area from which the building absent area is excluded, as a changed building in the predetermined area.

The invention can detect a change in a building on a map more accurately.

BRIEF DESCRIPTION OF THE DRAWINGS

These objects and other objects and advantages of the present invention will become more apparent through the following detailed description and the accompanying drawings.

DETAILED DESCRIPTION OF THE PREFERRED EMBODIMENTS

Figure 1:
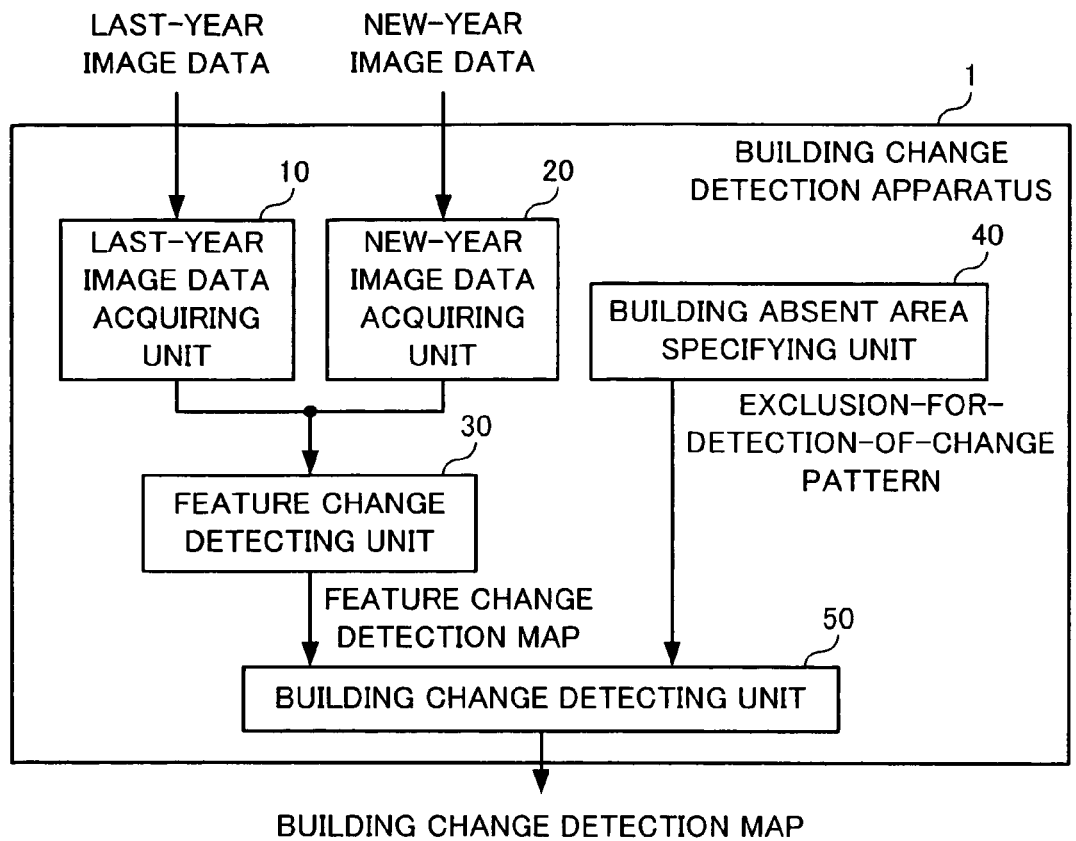
FIG. 1 is a block diagram schematically showing an example of the configuration of a building change detection apparatus according to a first embodiment of the invention.

Embodiments of the present invention will be described below in detail with reference to the accompanying drawings. Same reference numerals are given to those portions which are the same as or equivalent to the corresponding portions in the diagrams to avoid repeating the descriptions.

First Embodiment

The description of the first embodiment of the invention will be given of a building change detection apparatus that detects a change in a building in a predetermined area on a map between an arbitrary first time point and a subsequent second time point.

While the first time point and the second time point should be different dates and times, the following description of building change detection apparatus will be given of a case where the span between the first time point and the second time point is one year between a last year and a new year.

FIG. 1 is a block diagram schematically showing an example of the configuration of the building change detection apparatus 1 according to the first embodiment of the invention.

As shown in FIG. 1, a building change detection apparatus 1 includes a last-year image data acquiring unit 10, a new-year image data acquiring unit 20, a feature change detecting unit 30, a building absent area specifying unit 40, and a building change detecting unit 50.

The last-year image data acquiring unit 10 acquires photographed image data (hereinafter referred to as last-year image data) of a predetermined area (hereinafter referred to as detection target area) as a target to be subjected to detection of a change in a building at a predetermined date and time in the last year (hereinafter referred to as last-year time point).

Specifically, the last-year image data acquiring unit 10 acquires image data of two parallactic aerial photographs of a detection target area photographed from the sky. The two aerial photographs will be used in a later process to measure the heights of features including a building, tree, road, river, lake, etc. present on the ground by stereo photogrammetry.

The new-year image data acquiring unit 20 acquires photographed image data (hereinafter referred to as new-year image data) of the same detection target area as photographed for the last-year image data at a predetermined date and time in the new year (hereinafter referred to as new-year time point) about one year after the last-year time point.

The new-year image data acquiring unit 20, like the last-year image data acquiring unit 10, also acquires image data of two parallactic aerial photographs of a detection target area photographed from the sky.

The feature change detecting unit 30 compares the last-year image data with the new-year image data to detect a change in a feature in the detection target area.

Specifically, the feature change detecting unit 30 first acquires the height of the ground including a feature in the detection target area at the last-year time point from the last-year image data of the two parallactic aerial photographs, acquired by the last-year image data acquiring unit 10, by stereo photogrammetry. Next, the feature change detecting unit 30 acquires the height of the feature with the ground being a reference by subtracting the altitude of the ground surface from the acquired height of the ground including the feature. It is to be noted that altitude data of the ground surface in the detection target area is prestored in, for example, the building change detection apparatus 1. The feature change detecting unit 30 acquires the height of a feature on the ground at the last-year time point at all points in the detection target area in this way.

Using new-year image data of the two parallactic aerial photographs acquired by the new-year image data acquiring unit 20, the feature change detecting unit 30 performs a process similar to the aforementioned process using the last-year image data so as to acquire the height of a feature on the ground at a new-year time point at all points in the detection target area.

Subsequently, the feature change detecting unit 30 detects a change in a feature by comparing the height of the feature at the last-year time point with the height of the feature at the new-year time point at all points in the detection target area.

When there is no feature at some point in the detection target area at the last-year time point, i.e., the height of the feature is 0, but the height of a feature at the new-year time point is 8 m, for example, the feature change detecting unit 30 detects that a feature has been newly constructed at that point. When the height of a feature becomes taller from, for example, 4 m to 8 m between the last-year time point and the new-year time point, the feature change detecting unit 30 detects that a feature has been partly and newly constructed at that point. It is assumed hereinafter that new construction includes partial new construction.

Further, when the height of a feature at some point in the detection target area at the last-year time point is, for example, 8 m, but the height of the feature at the new-year time point is 0, the feature change detecting unit 30 detects that the feature has disappeared at that point. When the height of a feature becomes shorter from, for example, 8 m to 4 m between the last-year time point and the new-year time point, the feature change detecting unit 30 detects that the feature has partly disappeared at that point. It is assumed hereinafter that disappearance includes partial disappearance.

In this manner, the feature change detecting unit 30 detects a location where a change in a feature, such as new construction or disappearance thereof, has occurred by extracting changed points of the height in the detection target area at two different times.

Figure 2:
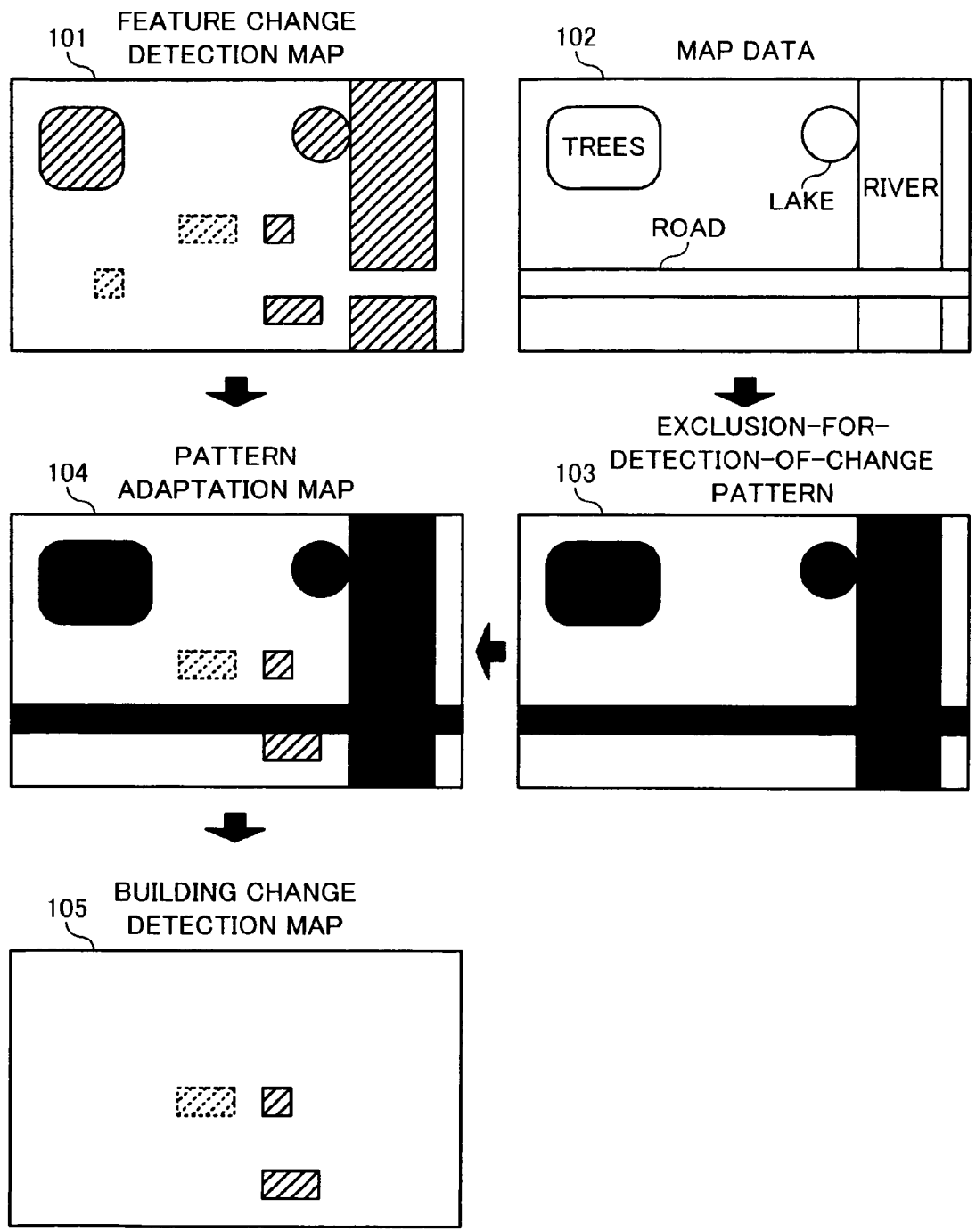
FIG. 2 is a diagram for explaining a process of creating a building change detection map.

Based on the detection result, the feature change detecting unit 30 creates a feature change detection map 101 indicating locations in the detection target area where changes in features have been detected as shown in FIG. 2. In the feature change detection map 101, a location surrounded by a solid line is where new construction of a feature is detected, and a location surrounded by a broken line is where disappearance of a feature is detected.

The building absent area specifying unit 40 specifies a building absent area in the detection target area where a building is not present.

The building change detection apparatus 1 according to the embodiment detects a change in a feature, particularly, a building, on the ground. It is therefore necessary to exclude detection of a change in a feature other than a building.

Features on the ground include a building, tree, road, river, lake, etc. each of which changes its height at its location. For example, a building changes its height due to new construction (new building), disappearance or the like. A tree, on the other hand, changes its height due to growing, pruning, cutting or the like thereof. Presence of a vehicle on a road changes the height of the road. A river, lake or the like changes its height due to a weather, tide or the like.

To detect a change in a building based on height information, therefore, it is necessary to exclude detection of a change in the height of a feature other than a building.

To exclude a building absent area where a building apparently does not exist from a detection target area, therefore the building absent area specifying unit 40 specifies such a building absent area.

Because buildings do not exist at such locations as a tree, road, river and lake, the building absent area includes the location of a tree, road, river, lake or the like.

The building absent area specifying unit 40 specifies building absent areas from map data indicating, for example, the location of a tree (forest), road, river, lake and the like. In this case, map data 102 of the detection target area as shown in FIG. 2 is prestored in, for example, the building change detection apparatus 1.

The building absent area specifying unit 40 may specify a building absent area by specifying the location of a tree, road, river, lake or the like in the detection target area by performing image processing on photographed image data of the detection target area.

Based on the specified building absent areas, the building absent area specifying unit 40 creates an exclusion-for-detection-of-change pattern 103 as shown in FIG. 2 which indicates the locations of building absent areas in the detection target area. A filled area in the exclusion-for-detection-of-change pattern 103 is a building absent area.

The building change detecting unit 50 detects a change in a building in the detection target area by setting a feature whose change is detected by the feature change detecting unit 30 in the detection target area from which the building absent areas are excluded, as a changed building in the detection target area.

Specifically, the building change detecting unit 50 overlays the feature change detection map 101 created by the feature change detecting unit 30 and the exclusion-for-detection-of-change pattern 103 created by the building absent area specifying unit 40 one on the other, to create a pattern adaptation map 104 as shown in FIG. 2, and excludes locations included in the building absent areas shown in the exclusion-for-detection-of-change pattern 103 from locations where changes in features are detected as shown in the feature change detection map 101. In this manner, the building change detecting unit 50 creates a building change detection map 105 as shown in FIG. 2 indicating the locations in the detection target area where changes in buildings are detected.

FIG. 2 is a diagram for explaining the process of creating the building change detection map 105.

The feature change detecting unit 30 creates the feature change detection map 101 indicating locations in the detection target area where changes in features are detected. The map data 102 shows the locations of features on the map in the detection target area. Based on the map data 102, the building absent area specifying unit 40 creates the exclusion-for-detection-of-change pattern 103 indicating locations of building absent areas in the detection target area.

The building change detecting unit 50 overlays the feature change detection map 101 and the exclusion-for-detection-of-change pattern 103 to create the pattern adaptation map 104 which is the feature change detection map 101 masked by the exclusion-for-detection-of-change pattern 103. Then, based on the pattern adaptation map 104, the building change detecting unit 50 extracts change-detected locations other than the building absent areas shown in the exclusion-for-detection-of-change pattern 103, from the locations in the feature change detection map 101 where changes in features are detected, thereby creating the building change detection map 105 indicating the locations where changes in buildings are detected.

The building change detecting unit 50 outputs the created building change detection map 105 as the result of detecting changes in buildings.

The result of detection of changes in buildings may not be a map form, but may be in a form in which positional information of the locations where changes in buildings are detected is represented by information of longitude and altitude or the like.

Although changes in features in a detection target area are detected, and then changes detected in building absent areas are excluded in the embodiment, changes in buildings may be detected by excluding building absent areas from a detection target area, and then detecting changes in features in the exclusion-achieved area.

As described above, the building change detection apparatus according to the embodiment detects a change in a building in a detection target area by excluding a building absent area where a change in a feature other than a building is detected from the detection target area.

Therefore, the building change detection apparatus according to the embodiment can suppress the rate of occurrence of erroneous detections of detecting a change in a feature other than a building as a change in a building, and can detect a change in a building with a high accuracy.

Figure 3:
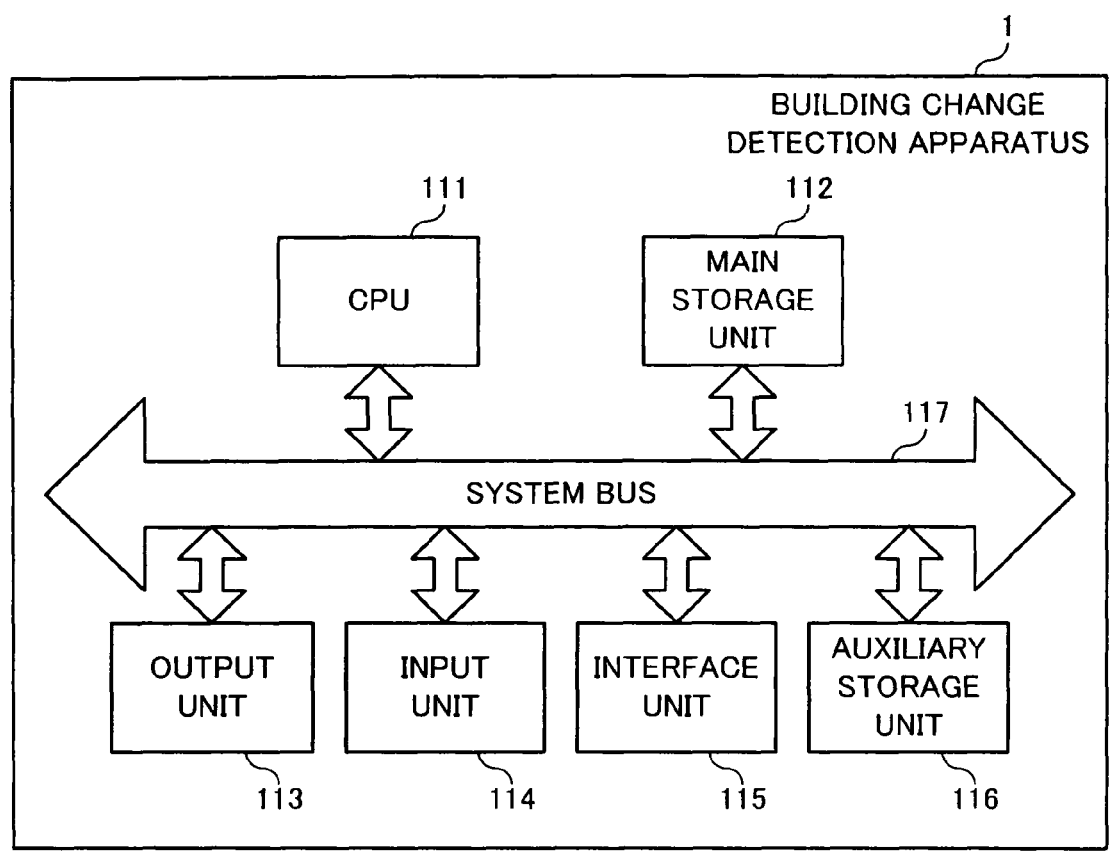
FIG. 3 is a block diagram schematically showing an example of the physical configuration of the building change detection apparatus according to the embodiment.

FIG. 3 is a block diagram schematically showing an example of the physical configuration of the building change detection apparatus 1 according to the embodiment.

The building change detection apparatus 1 according to the embodiment can be implemented by a hardware configuration similar to that of an ordinary computer device, and comprises a CPU (Central Processing Unit) 111, a main storage unit 112, an output unit 113, an input unit 114, an interface unit 115, an auxiliary storage unit 116, and a system bus 117. The main storage unit 112, the output unit 113, the input unit 114, the interface unit 115 and the auxiliary storage unit 116 are all connected to the CPU 111 by the system bus 117.

The CPU 111 executes a building change detecting processing for the foregoing detection of a change in a building according to a program stored in the auxiliary storage unit 116.

The main storage unit 112 is a main memory such as RAM (Random Access Memory), and is used as a data work area and an area where data is temporarily saved.

The output unit 113 includes a display, a printer, a speaker or the like, and outputs the processing result of the building change detecting processing in the building change detection apparatus 1. For example, the output unit 113 outputs the building change detection map 105 created by the building change detecting unit 50 as the processing result.

The input unit 114 comprises a keyboard, a mouse and the like, and inputs an operator's instruction.

The interface unit 115 is connected to peripheral devices to exchange data therewith. For example, the interface unit 115 is connected to an image data pickup apparatus, and receives image data from the pickup apparatus, so that the building change detection apparatus 1 acquires last-year image data and new-year image data.

The auxiliary storage unit 116 comprises a non-volatile memory, such as ROM (Read Only Memory), magnetic disk or semiconductor memory, and prestores a program and data for allowing the CPU 111 to execute the building change detecting processing. In response to an instruction from the CPU 111, the auxiliary storage unit 116 supplies the program and data to the CPU 111, and stores data supplied from the CPU 111.

For example, the auxiliary storage unit 116 stores altitude data of the ground surface of a detection target area, the map data 102 of the detection target area, etc.

The functions of the last-year image data acquiring unit 10, the new-year image data acquiring unit 20, the feature change detecting unit 30, the building absent area specifying unit 40 and the building change detecting unit 50 shown in FIG. 1 are achieved on the software basis as the CPU 111 loads the program for the building change detecting processing, which is stored in the auxiliary storage unit 116, into the main storage unit 112 and executes the program to control the individual units shown in FIG. 3.

Note that the individual units shown in FIG. 1 may be achieved on the hardware basis by a hardware part, such as an LSI (Large Scale Integration), which has dedicated circuits to achieve their functions installed thereon.

Figure 4:
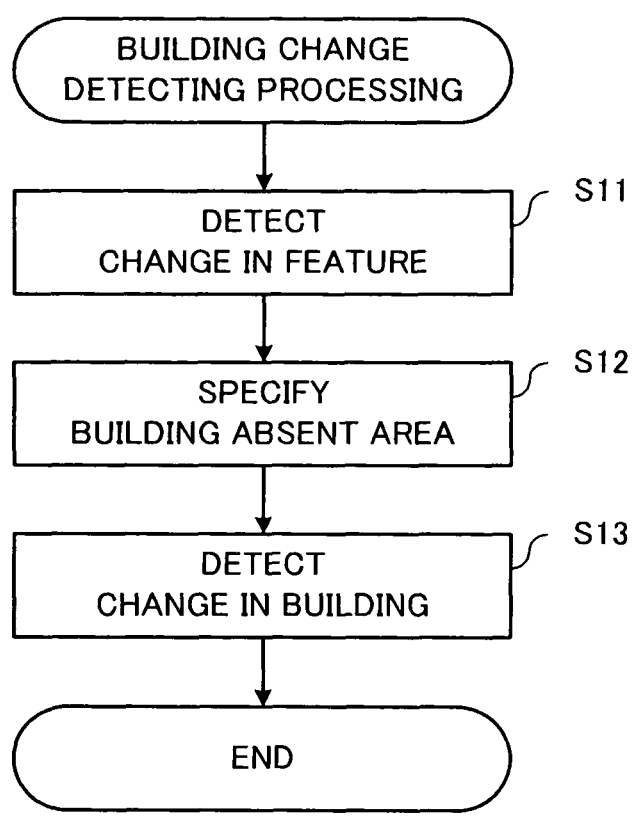
FIG. 4 is a flowchart illustrating one example of a building change detecting processing.

FIG. 4 is a flowchart illustrating one example of the building change detecting processing.

This processing is executed as the CPU 111 in the building change detection apparatus 1 controls the main storage unit 112, the output unit 113, the input unit 114, the interface unit 115, the auxiliary storage unit 116, etc. through the system bus 117 according to the program.

When the building change detecting processing starts, first, last-year image data and new-year image data, both obtained by photographing a detection target area for changes in buildings are compared with each other to detect changes in features including a building in the detection target area (step S11).

Specifically, the building change detection apparatus 1 fetches the last-year image data and new-year image data from, for example, a pickup apparatus connected to the interface unit 115, and stores the data in the auxiliary storage unit 116 in advance. The building change detection apparatus 1 compares the last-year image data and new-year image data, stored in the auxiliary storage unit 116, with each other by digital image processing, and detects a change in a feature in the detection target area based on the difference between the last-year image data and the new-year image data. Based on the detection, the building change detection apparatus 1 creates the feature change detection map 101 having positional information of a feature whose change is detected.

Next, the building change detection apparatus 1 specifies a building absent area in the detection target area where no building is present (step S12).

Specifically, the building change detection apparatus 1 stores the map data 102 having positional information on a tree, road, river, lake, etc. in the detection target area in the auxiliary storage unit 116 in advance. Based on the map data 102, the building change detection apparatus 1 specifies the location of a tree, road, river, lake or the like where no building is present, as a building absent area. The building change detection apparatus 1 creates the exclusion-for-detection-of-change pattern 103 having positional information of building absent areas in the detection target area.

A building absent area may be specified from image data of the detection target area photographed, such as last-year image data and new-year image data, not from the map data 102.

Next, the building change detection apparatus 1 extracts a feature whose change is detected in step S11, from an area obtained by excluding the building absent area specified in step S12 from the detection target area, detects a change in a building in the detection target area by considering the extracted feature as a building which is changed in the detection target area (step S13), and then terminates the building change detecting processing.

Specifically, the building change detection apparatus 1 creates the pattern adaptation map 104 in which the feature change detection map 101 and the exclusion-for-detection-of-change pattern 103 are overlaid one on the other. The building change detection apparatus 1 creates the building change detection map 105 having positional information where a change in a building is detected in the detection target area, by extracting the location where a change in a feature is detected in the area which is not masked by the exclusion-for-detection-of-change pattern 103 on the pattern adaptation map 104.

In the building change detecting processing, after a change in a feature in a detection target area is detected, a building absent area is specified and a change detected in the building absent area is excluded. However, a building absent area may be specified and excluded from a detection target area first, after which a change in a feature in the exclusion-achieved area may be detected to detect a change in a building.

Second Embodiment

The description of the second embodiment of the invention will be given of a case where building absent areas which are specified by the building absent area specifying unit 40 shown in FIG. 1 are classified according to the types of features and then specified accordingly.

Of features, a tree grows, and the pruning, cutting, planting or the like thereof is relatively easy, so that its location is not likely to be accurately shown on map data.

Meanwhile, a road, river, lake, etc. are unlikely to move their locations of presence, so that the locations of presence are shown on map data relatively accurately.

Therefore, the description of the embodiment will now be given of a case where features other than a building are classified into a tree and features other than the tree which include a road, river, lake and so forth.

Figure 5:
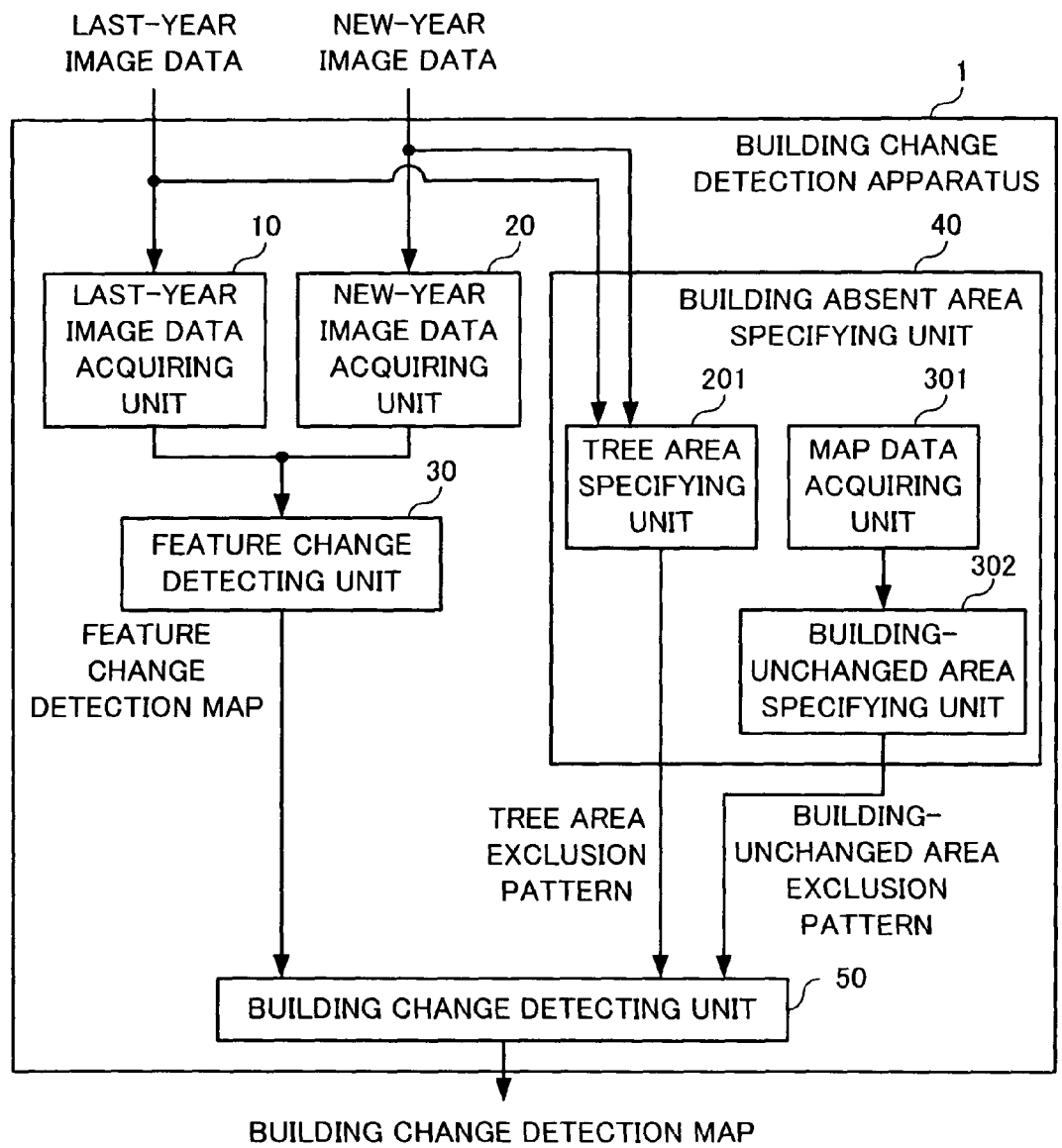
FIG. 5 is a block diagram schematically showing an example of the configuration of a building change detection apparatus according to a second embodiment of the invention.

FIG. 5 is a block diagram schematically showing an example of the configuration of the building change detection apparatus 1 according to the second embodiment of the invention.

A building change detection apparatus 1 according to the second embodiment shown in FIG. 5 differs from the building change detection apparatus 1 according to the first embodiment in that the building absent area specifying unit 40 includes a tree area specifying unit 201, a map data acquiring unit 301 and a building-unchanged area specifying unit 302.

Last-year image data and new-year image data are input to the tree area specifying unit 201. The tree area specifying unit 201 specifies a tree area in a detection target area where a tree is present, as a building absent area, based on at least one of the last-year image data and the new-year image data.

Specifically, the tree area specifying unit 201 specifies a tree area in the detection target area where a tree is present through image processing of photographed image data of the detection target area, and creates a tree area exclusion pattern indicating the location of the tree area in the detection target area.

A tree area may be an area where trees are cut and a building is newly constructed in a short period of time.

An area where a road, river, lake or the like is present, on the other hand, is unlikely that the presence thereof changes in a short period of time, or that a building is present on such an area.

In this respect, the area of a road, river, lake, or the like is called a building-unchanged area where a change in a building does not occur.

The map data acquiring unit 301 acquires map data of the detection target area.

Based on the map data acquired by the map data acquiring unit 301, the building-unchanged area specifying unit 302 specifies a building-unchanged area in the detection target area, which includes a road, river, lake or the like where a change in a building does not occur, as the building absent area.

Specifically, the building-unchanged area specifying unit 302 specifies building-unchanged areas from the map data indicating the locations of a road, river, lake, etc., and creates a building-unchanged area exclusion pattern indicating the locations of the building-unchanged areas in the detection target area.

The building change detecting unit 50 acquires the tree area exclusion pattern created by the tree area specifying unit 201, and the building-unchanged area exclusion pattern created by the building-unchanged area specifying unit 302, and combines the patterns to create the exclusion-for-detection-of-change pattern 103 in FIG. 2 which indicates the locations of building absent areas including a tree area and a building-unchanged area and has been described in the description of the first embodiment.

Using the exclusion-for-detection-of-change pattern 103, the building change detecting unit 50 detects changes in buildings in the detection target area by setting features whose changes are detected by the feature change detecting unit 30 in the detection target area from which the building absent areas are excluded, as changed buildings in the detection target area, as in the first embodiment.

In the second embodiment, a tree area is specified based on image data, and the specified tree area is excluded from a detection target area to thereby detect a change in a building in the detection target area.

Therefore, the embodiment can efficiently eliminate the influence of a tree which has a relatively large positional change, and detect a change in a building with a high accuracy.

In addition, in the second embodiment, a building-unchanged area including a road, river and lake is specified based on map data, and the specified building-unchanged area is excluded from the detection target area to thereby detect a change in a building in the detection target area.

Therefore, the embodiment can efficiently eliminate the influence of a road, river, lake or the like which has a relatively small positional change, and detect a change in a building with a high accuracy.

Third Embodiment

The following modes may be considered in consideration of the influences of trees at the time of detecting a change in a building.

1. In a tree area in last-year image data, a tree is cut in new-year data and a building is newly constructed there.

2. While a building has been present in last-year image data, the building has disappeared in new-year data and a tree is planted there to yield a tree area.

The building change detection apparatus 1 that detects a change in a building in consideration of various modes in which a tree area changes will be described as the third embodiment of the invention.

For easier understanding of the third embodiment, the description of the influences of features, such as a road, river and lake, other than a tree is omitted. Accordingly, the diagrams which are used for the description of the third embodiment do not show the map data acquiring unit 301 and the building-unchanged area specifying unit 302 in FIG. 5 which have been described in the description of the second embodiment. Of course, the map data acquiring unit 301 and the building-unchanged area specifying unit 302 may however be added to the building change detection apparatus 1 according to the third embodiment.

Figure 6:
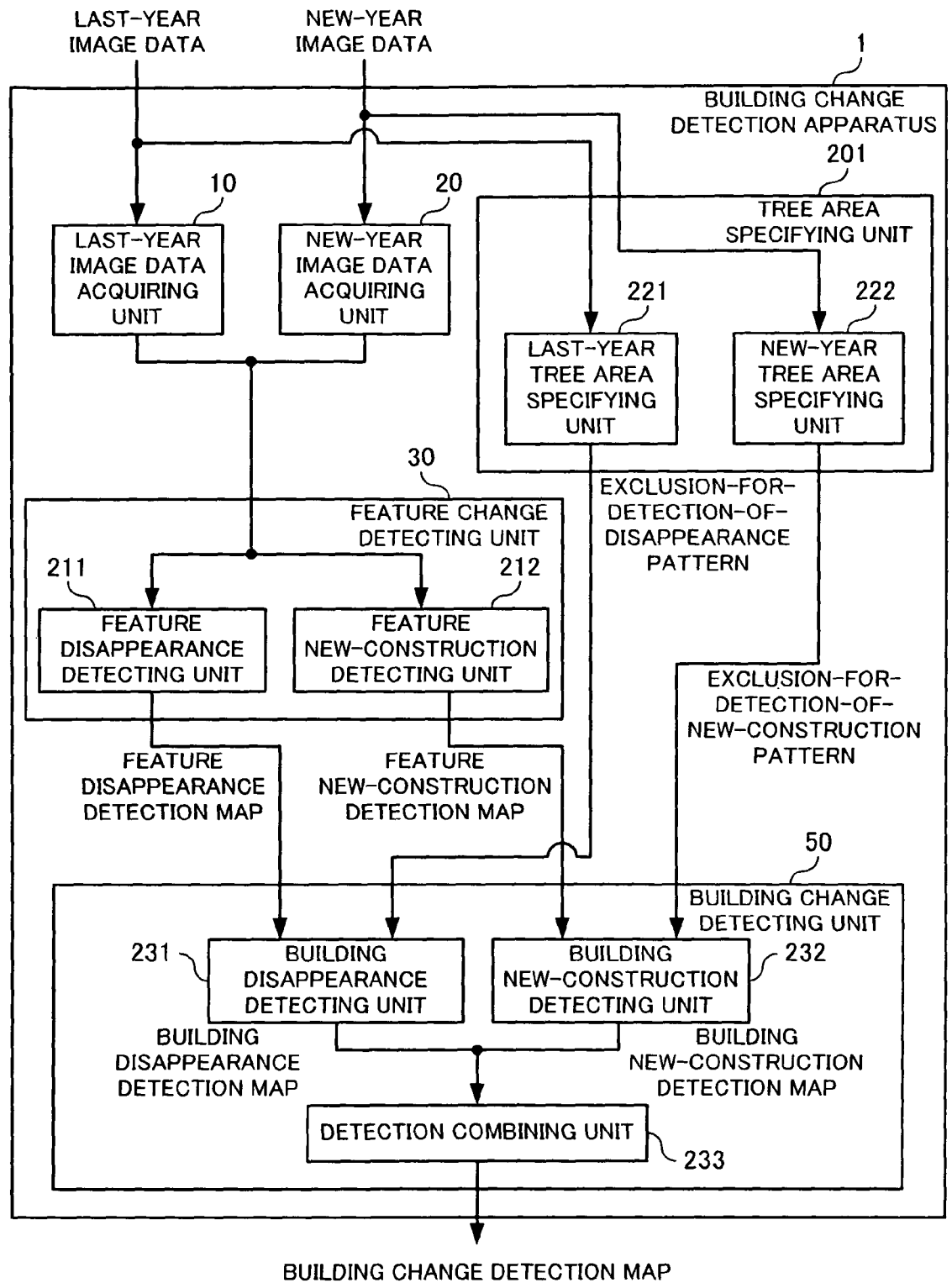
FIG. 6 is a block diagram schematically showing an example of the configuration of a building change detection apparatus according to a third embodiment of the invention.

FIG. 6 is a block diagram schematically showing an example of the configuration of the building change detection apparatus 1 according to the third embodiment of the invention.

The building change detection apparatus 1 according to the third embodiment shown in FIG. 6 differs from the building change detection apparatus 1 according to the second embodiment in that the building absent area specifying unit 40 shown in FIG. 5 is replaced with the tree area specifying unit 201.

In the building change detection apparatus 1 according to the third embodiment, the feature change detecting unit 30 includes a feature disappearance detecting unit 211 and a feature new-construction detecting unit 212. The tree area specifying unit 201 includes last-year tree area specifying unit 221 and a new-year tree area specifying unit 222. The building change detecting unit 50 includes a building disappearance detecting unit 231, a building new-construction detecting unit 232 and a detection combining unit 233.

Further, in the third embodiment, last-year image data includes last-year color image data of a detection target area photographed in color, and last-year infrared image data of the detection target area photographed by infrared. New-year image data includes new-year color image data of the detection target area photographed in color, and new-year infrared image data of the detection target area photographed by infrared.

In the embodiment, near-infrared image data of a detection target area near-infrared-photographed is used as infrared image data.

The last-year color image data is input to the last-year image data acquiring unit 10 and the last-year tree area specifying unit 221. The last-year infrared image data is input to the last-year tree area specifying unit 221.

The new-year color image data is input to the new-year image data acquiring unit 20 and the new-year tree area specifying unit 222. The new-year infrared image data is input to the new-year tree area specifying unit 222.

The feature disappearance detecting unit 211 detects disappearance of a feature as a change in a feature.

Figure 7:
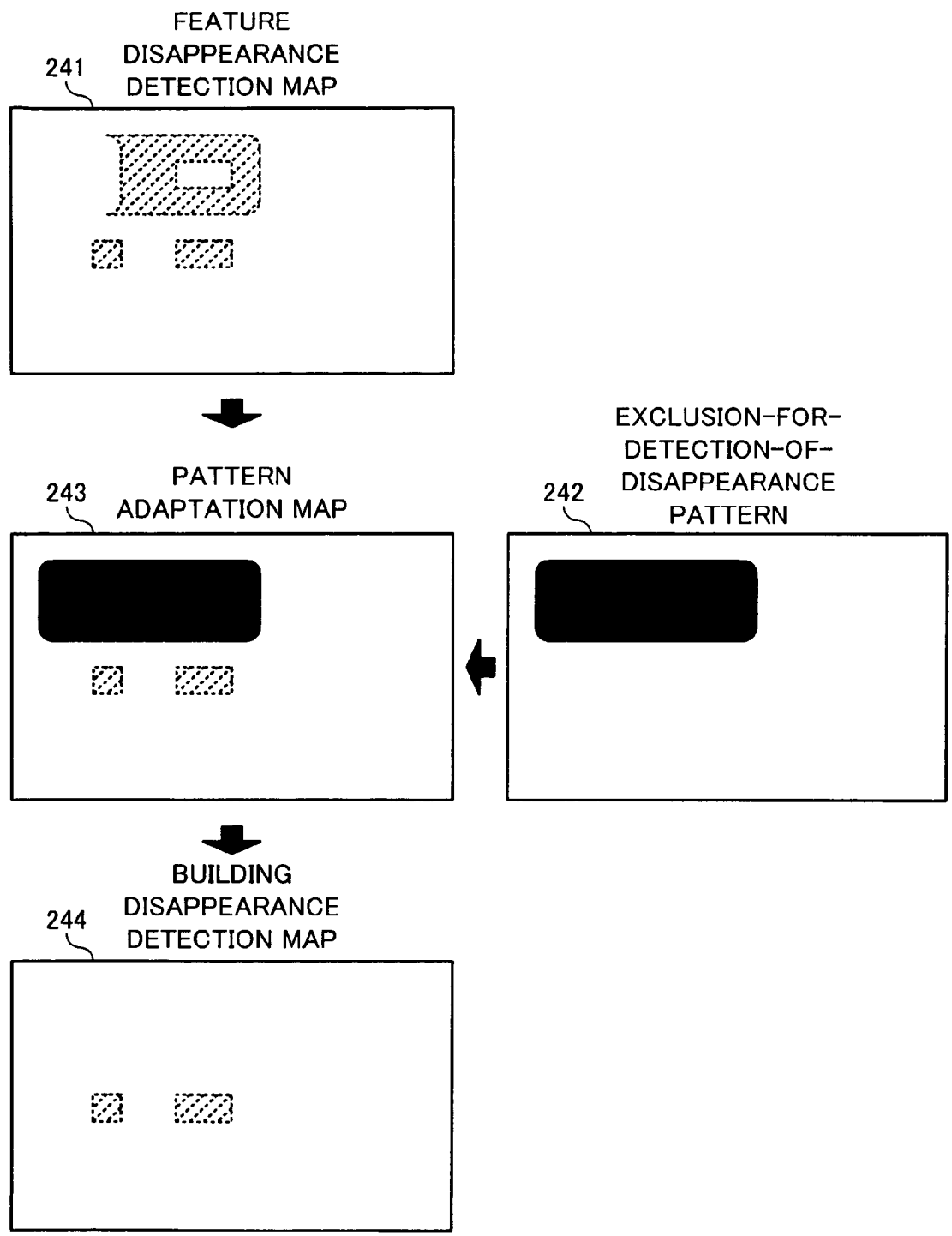
FIG. 7 is a diagram for explaining a process of creating a building disappearance detection map.

Specifically, the feature disappearance detecting unit 211 compares the last-year color image data with the new-year color image data to detect only disappearance of a feature in changes in features. Based on the detection result, the feature disappearance detecting unit 211 creates a feature disappearance detection map 241 indicating the locations in the detection target area where disappearance of features is detected as shown in FIG. 7. In the feature disappearance detection map 241, a location surrounded by a broken line is where disappearance of a feature is detected.

The feature new-construction detecting unit 212 detects new construction of a feature as a change in a feature.

Figure 8:
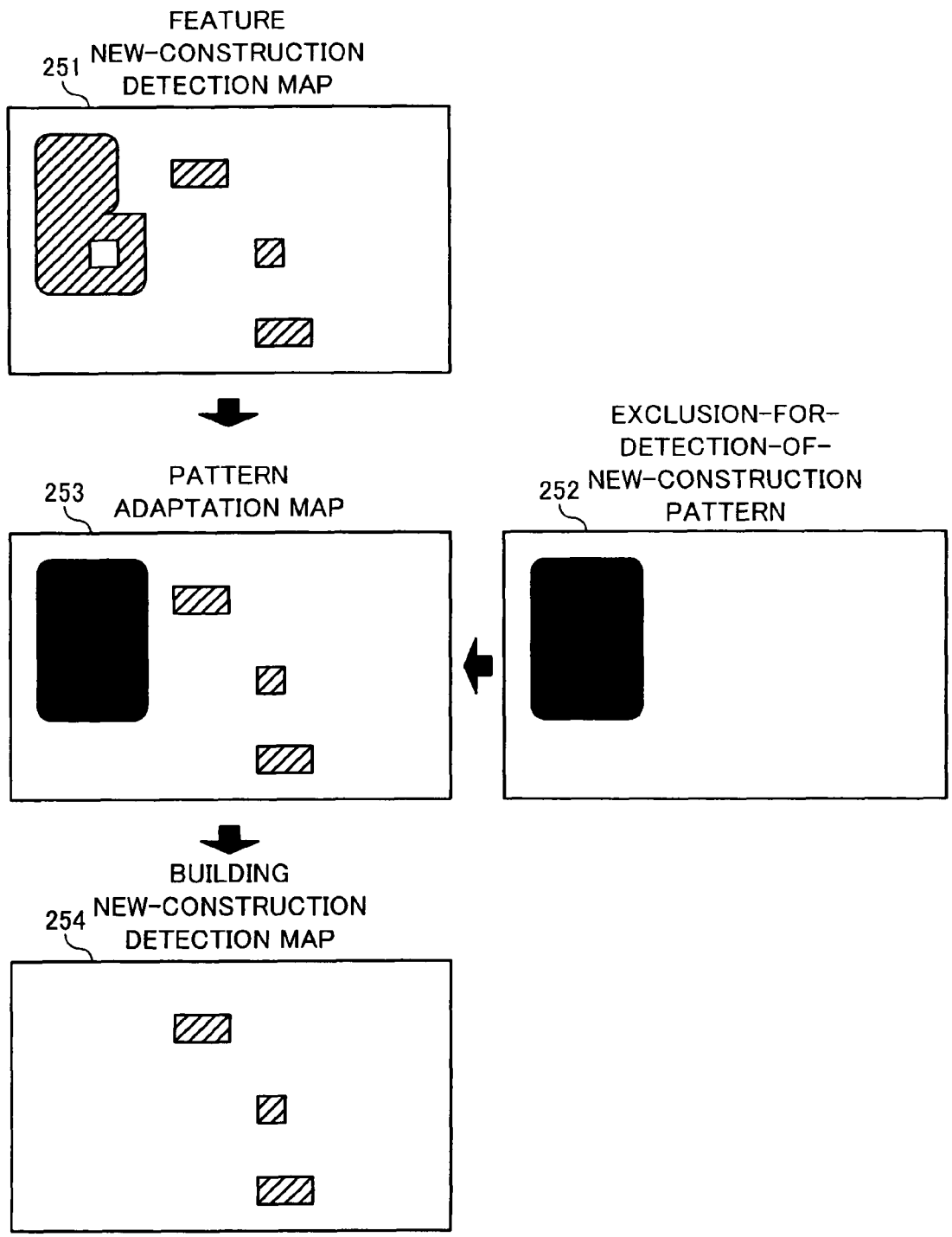
FIG. 8 is a diagram for explaining a process of creating a building new-construction detection map.

Specifically, the feature new-construction detecting unit 212 compares the last-year color image data with the new-year color image data to detect only new construction of a feature in changes in features. Based on the detection result, the feature new-construction detecting unit 212 creates a feature new-construction detection map 251 indicating the locations in the detection target area where new construction of features is detected as shown in FIG. 8. In the feature new-construction detection map 251, a location surrounded by a solid line is where new construction of a feature is detected.

The last-year tree area specifying unit 221 specifies a last-year tree area which is a tree area in the detection target area at the last-year time point by using the last-year color image data and last-year infrared image data.

To specify a tree area in the detection target area based on the color image data and infrared image data, an area which belongs to a tree temperature range is extracted from the infrared image data first. Next, an area whose red component which is the complementary color to green or the likely color of trees is less than a predetermined threshold value is extracted from the color image data. Then, an area where the areas respectively extracted from the infrared image data and the color image data overlap each other is specified as a tree area.

The last-year tree area specifying unit 221 specifies a last-year tree area in the detection target area based on the input last-year infrared image data and last-year color image data.

Based on the specified last-year tree area, the last-year tree area specifying unit 221 creates a last-year tree area exclusion pattern indicating the location of the last-year tree area in the detection target area.

At the location which has been a tree area at the last-year time point, it is possible that trees have been cut thereafter and a building is newly constructed at the new-year time point. Meanwhile, at the location which has been a tree area at the last-year time point, it is apparent that a building has not existed at the last-year time point, so that disappearance of a building at the new-year time point is not probable. Accordingly, the last-year tree area specifying unit 221 sets the last-year tree area exclusion pattern to an exclusion-for-detection-of-disappearance pattern 242 as shown in FIG. 7 for excluding the last-year tree area from targets to be subjected to detection of disappearance of a building. A filled area in the exclusion-for-detection-of-disappearance pattern 242 is a last-year tree area.

Even if disappearance of a feature is detected at the location which has been a tree area at the last-year time point, it is not disappearance of a building, so that the use of the exclusion-for-detection-of-disappearance pattern 242 can prevent disappearance of other than a building from being erroneously detected as disappearance of a building.

The new-year tree area specifying unit 222 specifies a new-year tree area which is a tree area in the detection target area at the new-year time point by using the new-year color image data and new-year infrared image data.

The new-year tree area specifying unit 222 performs a tree area specifying process similar to that of the last-year tree area specifying unit 221 based on the input new-year infrared image data and new-year color image data to specify a new-year tree area in the detection target area.

Based on the specified new-year tree area, the new-year tree area specifying unit 222 creates a new-year tree area exclusion pattern indicating the location of the new-year tree area in the detection target area.

At the location which is a tree area at the new-year time point, it is possible that a building which has been present at the last-year time point has disappeared and trees have been planted thereafter. Meanwhile, at the location which is a tree area at the new-year time point, it is apparent that a building is not present at the new-year time point, so that new construction of a building at the new-year time point is not probable. Accordingly, the new-year tree area specifying unit 222 sets the new-year tree area exclusion pattern to an exclusion-for-detection-of-new-construction pattern 252 as shown in FIG. 8 for excluding the new-year tree area from targets to be subjected to detection of new construction of a building. A filled area in the exclusion-for-detection-of-new-construction pattern 252 is a new-year tree area.

Even if new construction of a feature is detected at the location which is a tree area at the new-year time point, it is not new construction of a building, so that the use of the exclusion-for-detection-of-new-construction pattern 252 can prevent new construction of other than a building from being erroneously detected as new construction of a building.

The building disappearance detecting unit 231 detects disappearance of a building in the detection target area by setting a feature whose disappearance is detected by the feature disappearance detecting unit 211 in an area obtained by excluding the last-year tree area from the detection target area, as a building which has disappeared in the detection target area.

Specifically, the building disappearance detecting unit 231 overlays the feature disappearance detection map 241 created by the feature disappearance detecting unit 211 and the exclusion-for-detection-of-disappearance pattern 242 created by the last-year tree area specifying unit 221 one on the other, to create a pattern adaptation map 243 as shown in FIG. 7, and excludes locations included in the last-year tree areas shown in the exclusion-for-detection-of-disappearance pattern 242 from the location where disappearance of a feature is detected shown in the feature disappearance detection map 241. In this manner, the building disappearance detecting unit 231 creates a building disappearance detection map 244 as shown in FIG. 7 indicating a location in the detection target area where disappearance of a building is detected.

FIG. 7 is a diagram for explaining the process of creating the building disappearance detection map 244.

The building disappearance detecting unit 231 overlays the feature disappearance detection map 241 and the exclusion-for-detection-of-disappearance pattern 242 to create the pattern adaptation map 243 which is the feature disappearance detection map 241 masked by the exclusion-for-detection-of-disappearance pattern 242. Then, based on the pattern adaptation map 243, the building disappearance detecting unit 231 extracts the disappearance-detected location other than the last-year tree area shown in the exclusion-for-detection-of-disappearance pattern 242, from the location in the feature disappearance detection map 241 where disappearance of a feature is detected, thereby creating the building disappearance detection map 244 indicating the location where disappearance of a building is detected.

The building new-construction detecting unit 232 detects new construction of a building in the detection target area by setting a feature whose new construction is detected by the feature new-construction detecting unit 212 in an area obtained by excluding the new-year tree area from the detection target area, as a newly constructed building in the detection target area.

Specifically, the building new-construction detecting unit 232 overlays the feature new-construction detection map 251 created by the feature new-construction detecting unit 212 and the exclusion-for-detection-of-new-construction pattern 252 created by the new-year tree area specifying unit 222 one on the other, to create a pattern adaptation map 253 as shown in FIG. 8, and excludes locations included in the new-year tree areas shown in the exclusion-for-detection-of-new-construction pattern 252 from the location where new construction of a feature is detected shown in the feature new-construction detection map 251. In this manner, the building new-construction detecting unit 232 creates a building new-construction detection map 254 as shown in FIG. 8 indicating a location in the detection target area where new construction of a building is detected.

FIG. 8 is a diagram for explaining the process of creating the building new-construction detection map 254.

The building new-construction detecting unit 232 overlays the feature new-construction detection map 251 and the exclusion-for-detection-of-new-construction pattern 252 to create the pattern adaptation map 253 which is the feature new-construction detection map 251 masked by the exclusion-for-detection-of-new-construction pattern 252. Then, based on the pattern adaptation map 253, the building new-construction detecting unit 232 extracts the new-construction-detected location other than the new-year tree area shown in the exclusion-for-detection-of-new-construction pattern 252, from the location in the feature new-construction detection map 251 where new construction of a feature is detected, thereby creating the building new-construction detection map 254 indicating the location where new construction of a building is detected.

The detection combining unit 233 combines detection of disappearance of a building by the building disappearance detecting unit 231 and detection of new construction of a building by the building new-construction detecting unit 232 to detect changes including new construction of a building and disappearance thereof in the detection target area.

Figure 9:
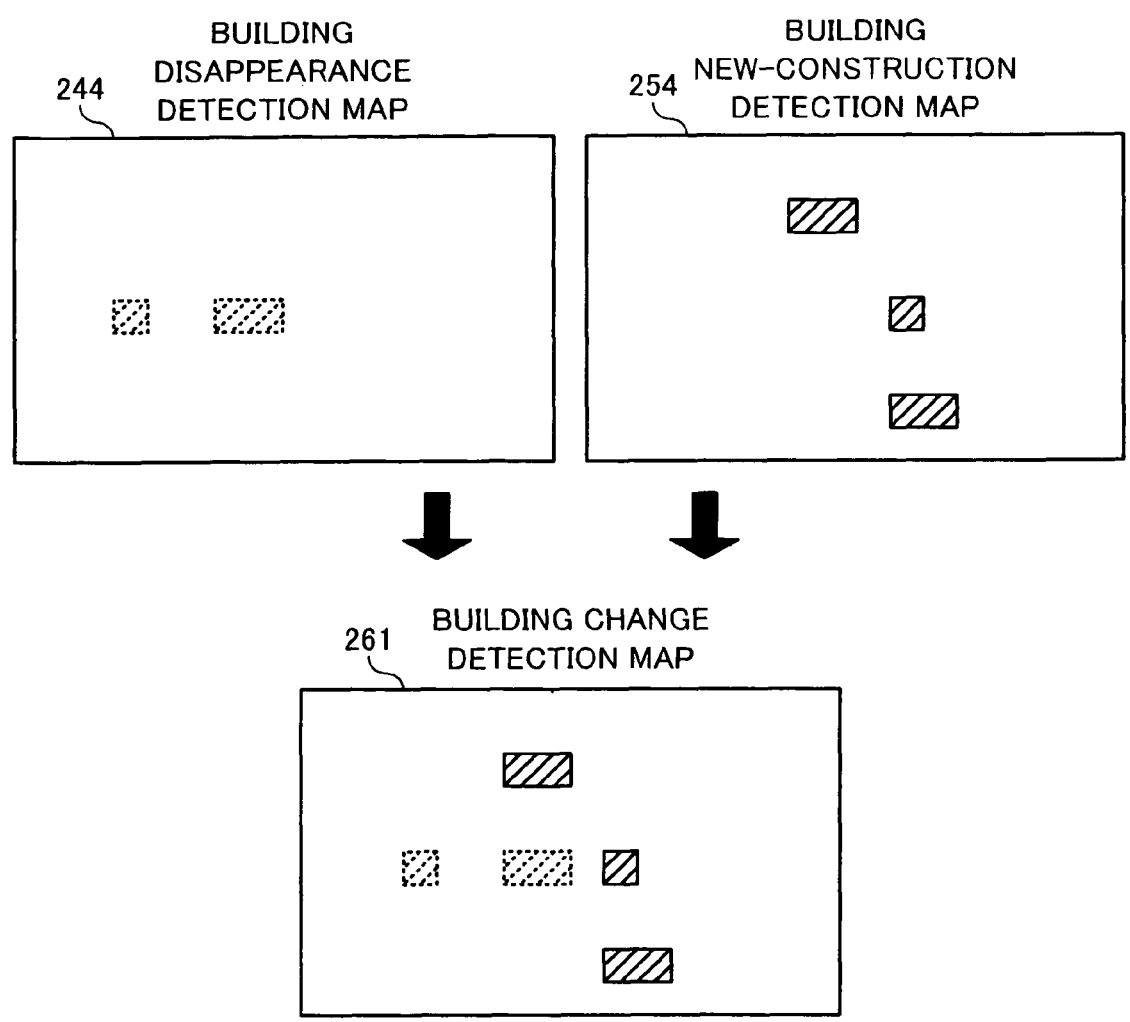
FIG. 9 is a diagram for explaining a process of achieving a combination by a detection combining unit.

FIG. 9 is a diagram for explaining a process of achieving the combination by the detection combining unit 233.

The detection combining unit 233 combines the building disappearance detection map 244 in FIG. 7 created by the building disappearance detecting unit 231 with the building new-construction detection map 254 in FIG. 8 created by the building new-construction detecting unit 232 to create a building change detection map 261 in FIG. 9 which shows locations in the detection target area where disappearance of a building is detected and where new construction of a building is detected.

The building change detection map 261 has positional information in the detection target area where a change in a building is detected and information indicating the types of changes, such as disappearance and new construction.

The detection combining unit 233 outputs the created building change detection map 261 as the result of detecting changes in buildings.

In the third embodiment described above, a tree area is specified by using infrared image data which is photographed at the same time as two pieces of color image data used in stereo photogrammetry. Therefore, the third embodiment can reduce detection unnecessary points and detection errors both associated with trees in the detection of changes in buildings, thus making it possible to improve the accuracy of detection of changes in buildings.

In the third embodiment, a tree portion is excluded from targets for detection of changes in buildings. Therefore, the third embodiment can reduce detection unnecessary points in the detection of changes in buildings, and can prevent a changed portion of a tree itself from being detected as a difference.

In the third embodiment, new and old infrared image data are separately used to prepare an exclusion pattern for detection of new construction and an exclusion pattern for detection of disappearance. Therefore, the third embodiment can detect a change in a building even when a tree portion is changed to a building or vice versa, and prevent mis-detection of new construction and disappearance of a building at a tree portion.

For example, a change in a building can be detected even at a location where change from a tree to a building or from a building to a tree has occurred.

In the third embodiment, infrared image data at both a last-year time point and a new-year time point are acquired. Even when only infrared image data at either one of the points can be acquired, however, the building change detection apparatus 1 can increase the accuracy of detecting a change in a building as compared with the case where infrared image data at both points cannot be acquired.

When only infrared image data at the last-year time point is acquired, for example, only the last-year tree area specifying unit 221 in the tree area specifying unit 201 is activated to create the exclusion-for-detection-of-disappearance pattern 242. This can increase the accuracy of detecting disappearance of a building.

When only infrared image data at the new-year time point is acquired, only the new-year tree area specifying unit 222 in the tree area specifying unit 201 is activated to create the exclusion-for-detection-of-new-construction pattern 252. This can increase the accuracy of detecting new construction of a building.

Although the embodiments of the invention have been described above, various forms of modifications and applications are possible in working out the invention, which is not limited to the foregoing first to third embodiments.

For example, the above-described configuration of the building change detection apparatus 1, the sequence of process procedures, the maps, the patterns, etc. are just illustrative, and can be modified and changed arbitrarily within the scope of the technical idea of the invention.

Although the above-described maps, patterns and the like have been described in map forms for easier understanding, positional information, change information and so forth may have forms of predetermined data structures.

The functions of the building change detection apparatuses 1 according to the foregoing embodiments can be realized by dedicated hardware as well as an ordinary computer system.

For example, programs stored in the auxiliary storage unit 116 of the building change detection apparatuses 1 according to the foregoing embodiments may be stored in a computer readable recording medium, such as a CD-ROM (Compact Disk Read-Only Memory), DVD (Digital Versatile Disk) or MO (Magneto-Optical disk), for distribution, and may be installed on a computer to configure the apparatus which executes the above-described processes.

The program may be stored in a disk drive unit or the like provided in a predetermined server unit on a communication network, such as the Internet, and may be superimposed on a carrier wave to be downloaded into a computer, for example.

In addition, the above-described processes can be achieved as the program transferred over the communication network is activated and executed.

Further, the above-described processes can also be achieved as all or part of the program is executed on a server unit, and the program is executed while the computer transmits and receives information on the process over the communication network.

When the above-described functions are shared and realized by the OS (Operating System) or realized by the cooperation of the OS and an application, for example, only those portions other than the OS may be stored in a medium for distribution, or downloaded into a computer.

Various embodiments and changes of the present invention may be made without departing from the broad spirit and scope of the invention. The foregoing embodiments are intended to illustrate the invention, not to limit the scope of the invention. The scope of the invention is shown by the attached claims rather than the embodiments. Various modifications made within the claims of the invention and within the meaning of an equivalent of the claims of the invention, are to be regarded to lie in the scope of the invention.

What is claimed is:

1. A building change detection apparatus for detecting a change in a building in a predetermined area on a map between a first time point and a second time point later than the first time point, the apparatus comprising:
   a first image data acquiring unit that acquires first image data of the predetermined area photographed at the first time point;
   a second image data acquiring unit that acquires second image data of the predetermined area photographed at the second time point;
   a feature change detecting unit that compares the first image data with the second image data to detect changes in features including a building in the predetermined area;
   a building absent area specifying unit that specifies a building absent area in the predetermined area where a building is not present; and
   a building change detecting unit that detects a change in a building in the predetermined area by setting a feature whose change is detected by the feature change detecting unit in the predetermined area from which the building absent area is excluded, as a changed building in the predetermined area,
   wherein the building absent area specifying unit comprises a tree area specifying unit that specifies a tree area in the predetermined area where a tree is present, as the building absent area, based on at least one of the first image data and the second image data, and wherein the building change detecting unit detects a change in a building in the predetermined area by excluding a feature that is present in the tree area specified by the tree area specifying unit from a feature whose change is detected by the feature change detecting unit,
   wherein the first image data includes first color image data photographed in color, and first infrared image data photographed by infrared,
   wherein the second image data includes second color image data photographed in color, and second infrared image data photographed by infrared,
   wherein the feature change detecting unit comprises:
      a feature disappearance detecting unit that detects disappearance of a feature as a change in a feature; and
      a feature new-construction detecting unit that detects new construction of a feature as a change in a feature,
   wherein the tree area specifying unit comprises:
      a first tree area specifying unit that specifies a first tree area which comprises a tree area in the predetermined area at the first time point by using the first color image data and the first infrared image data; and
      a second tree area specifying unit that specifies a second tree area which comprises a tree area in the predetermined area at the second time point by using the second color image data and the second infrared image data, and
   wherein the building change detecting unit comprises:
      a building disappearance detecting unit that detects disappearance of a building in the predetermined area by setting a feature whose disappearance is detected by the feature disappearance detecting unit in the predetermined area from which the first tree area is excluded, as a building which has disappeared in the predetermined area;
      a building new-construction detecting unit that detects new construction of a building in the predetermined area by setting a feature whose new construction is detected by the feature new-construction detecting unit in the predetermined area from which the second tree area is excluded, as a newly constructed building in the predetermined area; and
      a unit that detects a change including a new construction of a building and disappearance thereof in the predetermined area by a combination of detection of disappearance of a building by the building disappearance detecting unit and detection of new construction of a building by the building new-construction detecting unit.

2. A building change detection apparatus for detecting a change in a building in a predetermined area on a map between a first time point and a second time point later than the first time point, the apparatus comprising:
- a first image data acquiring unit that acquires first image data of the predetermined area photographed at the first time point;
- a second image data acquiring unit that acquires second image data of the predetermined area photographed at the second time point;
- a feature change detecting unit that compares the first image data with the second image data to detect changes in features including a building in the predetermined area;
- a building absent area specifying unit that specifies a building absent area in the predetermined area where a building is not present; and
- a building change detecting unit that detects a change in a building in the predetermined area by setting a feature whose change is detected by the feature change detecting unit in the predetermined area from which the building absent area is excluded, as a changed building in the predetermined area,
- wherein the building absent area specifying unit comprises a tree area specifying unit that specifies a tree area in the predetermined area where a tree is present, as the building absent area, based on at least one of the first image data and the second image data, and wherein the building change detecting unit detects a change in a building in the predetermined area by excluding a feature that is present in the tree area specified by the tree area specifying unit from a feature whose change is detected by the feature change detecting unit, and
- wherein the building absent area specifying unit further comprises:
- a map data acquiring unit that acquires map data of the predetermined area; and
- a building-unchanged area specifying unit that specifies a building-unchanged area including a road, a river, and a lake where a change in a building does not occur, in the predetermined area, as the building absent area, based on the map data.

3. A building change detection method of detecting a change in a building in a predetermined area on a map between a first time point and a second time point later than the first time point, the method comprising:
- a feature change detecting procedure of comparing first image data of the predetermined area photographed at the first time point with second image data of the predetermined area photographed at the second time point to detect changes in features including a building in the predetermined area;
- a building absent area specifying procedure of specifying a building absent area in the predetermined area where a building is not present; and
- a building change detecting procedure of detecting a change in a building in the predetermined area by extracting a feature whose change is detected in the feature change detecting procedure in the predetermined area from which the building absent area is excluded, and setting the extracted feature as a changed building in the predetermined area,
- wherein the building absent area specifying procedure comprises specifying a tree area in the predetermined area where a tree is present, as the building absent area, based on at least one of the first image data and the second image data, and
- wherein the building change detecting procedure detects a change in a building in the predetermined area by excluding a feature that is present in the specified tree area from a feature whose change is detected in the feature change detecting procedure,
- wherein the first image data includes first color image data photographed in color, and first infrared image data photographed by infrared,
- wherein the second image data includes second color image data photographed in color, and second infrared image data photographed by infrared,
- wherein the feature change detecting procedure comprises:
- a feature disappearance detecting procedure that detects disappearance of a feature as a change in a feature; and
- a feature new-construction detecting procedure that detects new construction of a feature as a change in a feature,
- wherein the specifying the tree area comprises:
- a first tree area specifying that specifies a first tree area which comprises a tree area in the predetermined area at the first time point by using the first color image data and the first infrared image data; and
- a second tree area specifying that specifies a second tree area which comprises a tree area in the predetermined area at the second time point by using the second color image data and the second infrared image data, and
- wherein the building change detecting procedure comprises:
- a building disappearance detecting that detects disappearance of a building in the predetermined area by setting a feature whose disappearance is detected by the feature disappearance detecting procedure in the predetermined area from which the first tree area is excluded, as a building which has disappeared in the predetermined area;
- a building new-construction detecting that detects new construction of a building in the predetermined area by setting a feature whose new construction is detected by the feature new-construction detecting procedure in the predetermined area from which the second tree area is excluded, as a newly constructed building in the predetermined area; and
- detecting a change including a new construction of a building and disappearance thereof in the predetermined area by a combination of detection of disappearance of a building by the building disappearance detecting procedure and detection of new construction of a building by the building new-construction detecting procedure.

4. A non-transitory computer readable recording medium recording a program for detecting a change in a building in a predetermined area on a map between a first time point and a second time point later than the first time point, the program allowing a computer to function as:
- a first image data acquiring unit that acquires first image data of the predetermined area photographed at the first time point;
- a second image data acquiring unit that acquires second image data of the predetermined area photographed at the second time point;
- a feature change detecting unit that compares the first image data with the second image data to detect changes in features including a building in the predetermined area;

a building absent area specifying unit that specifies a building absent area in the predetermined area where a building is not present; and a building change detecting unit that detects a change in a building in the predetermined area by setting a feature whose change is detected by the feature change detecting unit in the predetermined area from which the building absent area is excluded, as a changed building in the predetermined area, and wherein the building absent area specifying unit comprises a tree area specifying unit that specifies a tree area in the predetermined area where a tree is present, as the building absent area, based on at least one of the first image data and the second image data, and wherein the building change detecting unit detects a change in a building in the predetermined area by excluding a feature that is present in the tree area specified by the tree area specifying unit from a feature whose change is detected by the feature change detecting unit, wherein the first image data includes first color image data photographed in color, and first infrared image data photographed by infrared, wherein the second image data includes second color image data photographed in color, and second infrared image data photographed by infrared, wherein the feature change detecting unit comprises:
a feature disappearance detecting unit that detects disappearance of a feature as a change in a feature; and
a feature new-construction detecting unit that detects new construction of a feature as a change in a feature, wherein the tree area specifying unit comprises:
a first tree area specifying unit that specifies a first tree area which comprises a tree area in the predetermined area at the first time point by using the first color image data and the first infrared image data; and
a second tree area specifying unit that specifies a second tree area which comprises a tree area in the predetermined area at the second time point by using the second color image data and the second infrared image data, and wherein the building change detecting unit comprises:
a building disappearance detecting unit that detects disappearance of a building in the predetermined area by setting a feature whose disappearance is detected by the feature disappearance detecting unit in the predetermined area from which the first tree area is excluded, as a building which has disappeared in the predetermined area;
a building new-construction detecting unit that detects new construction of a building in the predetermined area by setting a feature whose new construction is detected by the feature new-construction detecting unit in the predetermined area from which the second tree area is excluded, as a newly constructed building in the predetermined area; and
a unit that detects a change including a new construction of a building and disappearance thereof in the predetermined area by a combination of detection of disappearance of a building by the building disappearance detecting unit and detection of new construction of a building by the building new-construction detecting unit.

5. A building change detection method of detecting a change in a building in a predetermined area on a map between a first time point and a second time point later than the first time point, the method comprising:

a feature change detecting procedure of comparing first image data of the predetermined area photographed at the first time point with second image data of the predetermined area photographed at the second time point to detect changes in features including a building in the predetermined area;

a building absent area specifying procedure of specifying a building absent area in the predetermined area where a building is not present; and a building change detecting procedure of detecting a change in a building in the predetermined area by extracting a feature whose change is detected in the feature change detecting procedure in the predetermined area from which the building absent area is excluded, and setting the extracted feature as a changed building in the predetermined area, wherein the building absent area specifying procedure comprises specifying a tree area in the predetermined area where a tree is present, as the building absent area, based on at least one of the first image data and the second image data, and wherein the building change detecting procedure detects a change in a building in the predetermined area by excluding a feature that is present in the specified tree area from a feature whose change is detected in the feature change detecting procedure, wherein the building absent area specifying procedure further comprises:

acquiring map data of the predetermined area; and specifying a building-unchanged area including at least one of a road, a river, and a lake, where a change in a building does not occur, in the predetermined area, as the building absent area, based on the map data.

6. A non-transitory computer readable recording medium recording a program for detecting a change in a building in a predetermined area on a map between a first time point and a second time point later than the first time point, the program allowing a computer to function as:

a first image data acquiring unit that acquires first image data of the predetermined area photographed at the first time point;

a second image data acquiring unit that acquires second image data of the predetermined area photographed at the second time point;

a feature change detecting unit that compares the first image data with the second image data to detect changes in features including a building in the predetermined area;

a building absent area specifying unit that specifies a building absent area in the predetermined area where a building is not present; and a building change detecting unit that detects a change in a building in the predetermined area by setting a feature whose change is detected by the feature change detecting unit in the predetermined area from which the building absent area is excluded, as a changed building in the predetermined area, and wherein the building absent area specifying unit comprises a tree area specifying unit that specifies a tree area in the predetermined area where a tree is present, as the building absent area, based on at least one of the first image data and the second image data, and wherein the building change detecting unit detects a change in a building in the predetermined area by excluding a feature that is present in the tree area specified by the tree area specifying; unit from a feature whose change is detected by the feature change detecting unit, wherein the building absent area specifying unit further comprises:
a map data acquiring unit that acquires map data of the predetermined area; and
a building-unchanged area specifying unit that specifies a building-unchanged area including at least one of a road, a river, and a lake, where a change in a building does not occur, in the predetermined area, as the building absent area, based on the map data.

7. The apparatus of claim 2, wherein the feature change detecting unit excludes areas of the road, the river, and the lake from an area to be compared in comparing the first image data with the second image data to detect changes in the features including the building in the predetermined area.

8. The method of claim 5, wherein the feature change detecting procedure excludes areas of the road, the river, and the lake from an area to be compared in said comparing the first image data with the second image data to detect changes in the features including the building in the predetermined area.

9. The non-transitory computer readable recording medium of claim 6, wherein the feature change detecting unit excludes areas of the road, the river, and the lake from an area to be compared in comparing the first image data with the second image data to detect changes in the features including the building in the predetermined area.

10. The apparatus of claim 1, wherein the building change detecting unit excludes a tree area at the first time point from an area to be compared when detecting disappearance of the building, and excludes the tree area at the second time point from the area to be compared when detecting the new construction of the building.

11. The method of claim 3, wherein the building change detecting procedure excludes a tree area at the first time point from an area to be compared when detecting disappearance of the building, and excludes the tree area at the second time point from the area to be compared when detecting the new construction of the building.

12. The apparatus of claim 4, wherein the building change detecting unit excludes a tree area at the first time point from an area to be compared when detecting disappearance of the building, and excludes the tree area at the second time point from the area to be compared when detecting the new construction of the building.

\* \* \* \* \*